Nov. 25, 1958   A. F. SCHUMANN   2,861,769
VALVES
Filed July 16, 1953   2 Sheets-Sheet 1

Nov. 25, 1958  A. F. SCHUMANN  2,861,769
VALVES
Filed July 16, 1953  2 Sheets-Sheet 2
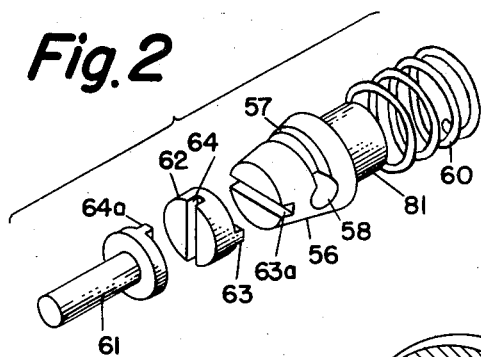
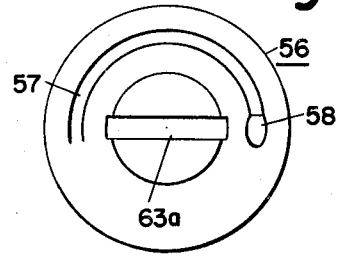
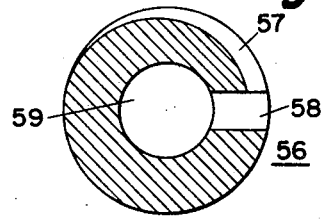
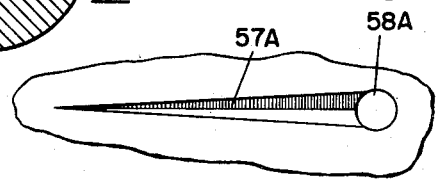
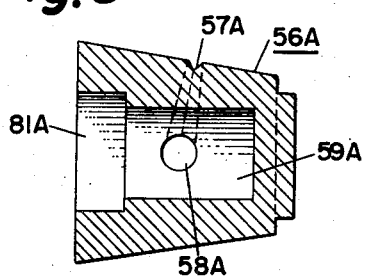
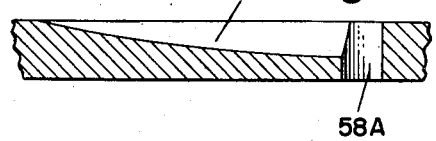
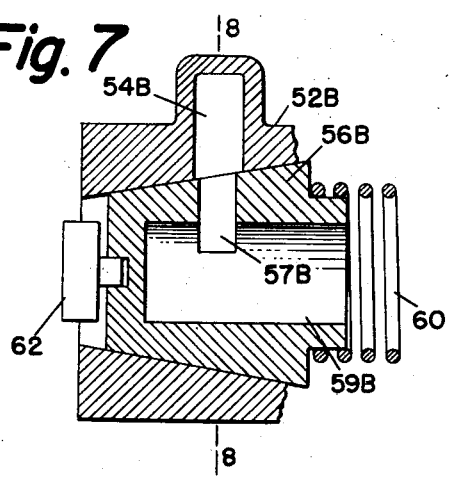
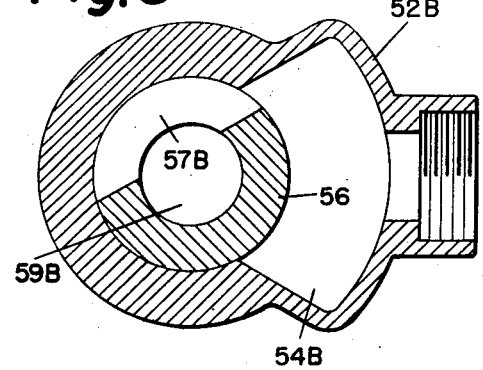

United States Patent Office 2,861,769
Patented Nov. 25, 1958

2,861,769

VALVES

Alfred F. Schumann, Lower Merion, Pa.

Application July 16, 1953, Serial No. 368,325

7 Claims. (Cl. 251—86)

This invention relates to valves and particularly to a valve incorporated in a burner for controlling the flow of liquid or gaseous fuel to the fuel nozzle of the burner.

This application is a continuation-in-part of copending application Serial No. 109,983, filed August 12, 1949, upon which U. S. Letters Patent 2,672,190 has issued.

In accordance with the present invention, the movable valve element is of conical shape with a peripherally extending metering slot in communication with an internal flow passage. The valve element is freely floating and is maintained seated in a ported conical recess of an associated valve body by a spring means. A flexible coupling between the valve element and its external operating member insures that the valve element is free to rotate about an axis defined by the engaged conical surfaces of the valve element and of the body recess. The force applied by the spring to the valve element opposes the axial component of force due to the inlet pressure of the controlled fluid so that the valve does not jam at higher input pressures but on the contrary is easier to operate, the force of the spring being sufficient, however, to maintain seating engagement of the valve element at the maximum input pressure of its intended operating range.

Further, and in accordance with a preferred embodiment of the invention, the peripheral metering slot of the valve element is a rectangular groove of fixed width and of progressively increasing depth to afford a substantially linear relationship between the angular position of the valve and liquid flow which can be obtained by a simple machining operation and which is maintained despite subsequent wear in service. Further, the groove, whether rectangular or of other cross section, terminates in a large radial passage which can be aligned with the inlet port for clearing the valve of sludge particles too large to pass the metering groove.

The invention further resides in features of construction and arrangement hereinafter described and claimed.

For a more complete understanding of the invention and for illustration of several embodiments thereof, reference is made to the accompanying drawings in which:

Fig. 2 is an exploded view showing some parts of the fuel valve of Fig. 1;

Fig. 3 is a front elevational view of the rotatable valve element of Fig. 2;

Fig. 4 is a sectional view of Fig. 3;

Fig. 5 is a sectional view, in side elevation, of a modification of the valve element shown in Figs. 2–4;

Figure 1:
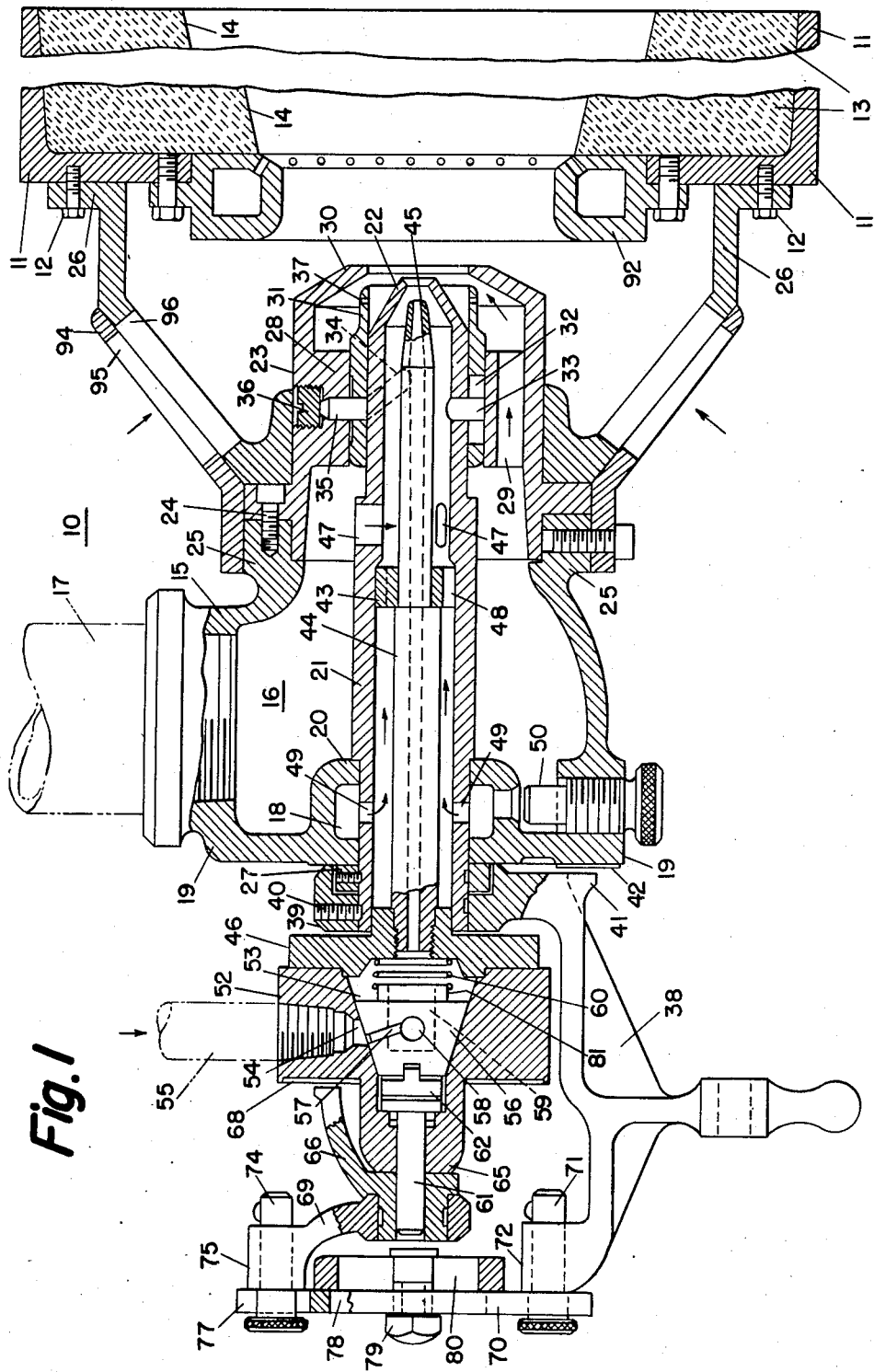
Fig. 1 is a sectional view, in side elevation, of a burner incorporating one form of fuel valve embodying the invention.

Figs. 6A, 6B, in plan and in sectional elevation, show the developed shape of the peripheral groove of Fig. 5;

Fig. 7 is a sectional view, in side elevation, of a modification of the fuel valve of Fig. 1; and Fig. 8 is a sectional view taken on line 8—8 of Fig. 7.

Referring to Fig. 1, the burner assembly 10 is shown attached to the front face of a burner tile plate 11 as by bolts 12. The burner tile 13 of suitable refractory material extends from the rear face of tile plate 11 and has an opening 14 diverging from the tile plate 11 to form an ignition or combustion chamber of a furnace. The housing member 15 of burner 10 is provided with a main chamber 16 which may receive air at a preselected constant pressure from a line 17 and is also provided with an auxiliary chamber 18 in part defined by front wall 19 of housing 15 and by an internal wall 20 thereof. The inner air nozzle 21 is rotatably received by aligned openings in the walls 19, 20 and extends through the main air chamber 16 with its discharge tip 22 within the outer air nozzle 23.

The outer air nozzle 23 extends from the rear wall 25 of housing 15 and is attached thereto as by bolts 24. The housing 15 is mounted on the front end of a conical bracket or housing 26 attached to the front face of tile plate 11. As the outer nozzle 23 is attached to the burner housing 15 which in turn is attached by bracket 26 to tile plate 11, the spacing between the tip of the outer air nozzle and the throat of the tile opening is fixed. The distances from the discharge end of the inner air nozzle to the discharge end of the outer air nozzle and to the throat of the tile opening 14 are also each invariable: specifically, collar 27 secured to the inner air nozzle 21 bears against the outer face of front wall 19 of housing 15 and a shoulder of the inner air nozzle bears against the rear face of internal wall 20, thus to preclude axial or longitudinal movement of the rotatable inner nozzle 21.

The forward part of inner nozzle 21 passes through bearing member 28 having passages for flow of air from main chamber 16 to the converging passage between the discharge tips 22, 30 of the air nozzles. The effective cross sectional area of this passage is variable by sleeve 31 slidable along the inner nozzle 21. As more fully shown in aforesaid application, Serial No. 109,983, now Patent No. 2,672,190, the sleeve 31 is provided with a longitudinally extending slot 32 which receives a pin 33 extending from the inner nozzle 21 and is also provided with an angularly extending slot 34 which receives a pin 35 retained by plug 36 in fixed position.

Thus as inner nozzle 21 is rotated in one direction or the other, the sleeve 31 is moved axially along nozzle 21 to vary the effective width of the converging air passage terminating at the annular discharge orifice formed by the tips 22, 30 of the air nozzles. The pitch of the angular slot 34 may be so chosen that 90° rotation of inner nozzle 21 corresponds with full travel of sleeve 31. The relationship between the angular position of air nozzle 21 and the amount of secondary air discharged from the outer air nozzle is substantially linear.

Since the aforesaid adjustment of secondary air is obtained without changing the positions of tips 22, 30 of the air nozzles with respect to the throat of tile opening 14, the efficiency of induction of atmospheric air by the jet action of the burner discharging is not impaired by control of the secondary air to obtain different combustion rates.

To afford adjustment of sleeve 31 to its various positions, there is provided an air control lever 38 having a hub 39 which receives the external end of inner air nozzle 21 and is attached thereto as by set screw 40. The index 41 attached to or integral with arm 38 cooperates with an "Air" scale 42 on the front face 19 of the valve housing 15. The scale 42 is linear and may be calibrated in arbitrary numerical units or it may, for a particular installation using a predetermined fixed air pressure, be calibrated in units of weight of air per minute.

Within and intermediate the ends of inner air nozzle 21, there may be provided a ported bearing 43 for support of fuel nozzle 44 having its discharge end or tip within the discharge tip 22 of inner air nozzle 21 for atomization of fuel oil by the primary air. The opposite or inlet end of fuel nozzle 44 is attached to and received by the hub of a stationary member 46 which forms the back part or plate of the fuel valve housing or body 52 later described. The inner nozzle 21 is provided with a series of ports 49 which provide for communication with the auxiliary air chamber 18: it may also be provided with a second series of ports 47 for admission of primary air from the main chamber 16. The ports 47 are tangential to impart a swirling motion to the air.

With valve 50 closed, there is no passage of air from the auxiliary chamber 18 into nozzle 21 and consequently, the ratio of angular to linear velocity of the primary air is high, resulting in a conical flame which is short and broad. As valve 50 is progressively opened, more and more air passes through ports 49 to increase the amount of air moving linearly of the nozzle. Consequently, the pitch of the primary air spiral is increased with resultant lengthening and narrowing of the flame.

The valve for controlling admission of fuel to nozzle 44 includes the body member 52 having a conical recess or chamber 53 provided with an inlet port 54 in communication with line 55 which supplies liquid fuel at preselected constant pressure. The conical recess 53 receives a conical valve element 56 having a peripheral metering slot 57 (Figs. 1 to 4) of rectangular cross section which progressively increases in depth from the periphery of valve element 56 and terminates in a radial passage 58 of substantially larger cross sectional area. The passage 58 extends to the axial bore 59 (Fig. 4) of the valve element 56 and so provides for passage of fluid from supply line 55 (Fig. 1) to the bore of the fuel nozzle 44 in amount dependent upon the angular setting of valve element 56. To clear the fuel valve of sludge particles too large to pass through the metering groove 57, the valve element 56 is momentarily turned to the position for which the large radial passage 58 is in alignment with inlet port 54.

The arcuate length of groove 57 may be substantially in excess of 90° and in initial machining of the valve element may approximate 180°. As the progressively deeper passage 57 is of rectangular cross section, the relationship between the angular position of valve element 56 and the amount of liquid passed by the valve per unit of time is linear. The metering groove 57 may be accurately formed by a simple inexpensive machining operation; for example, one or two passes of a milling cutter. The axis of the cutter may be parallel to the axis of the conical valve element 56; or in cutting of the groove shown in Figs. 1 to 4, the axis of the cutter is parallel to the inclined side of the valve and in a plane passing through the axis of the valve element. A further advantage of the rectangular peripheral groove construction is that the aforesaid linear relationship is true of valves so constructed even though in machining or honing them to finished dimensions there are inevitable slight differences in the arcuate length of groove 57 of the valve. To accommodate inevitable slight differences in machining of the valve and of their recessed conical seats embodying member 52, the width or diameter of inlet port 54 is somewhat greater than the width of groove 57.

As shown in Fig. 1, valve element 56 is free or floating to insure it is always properly seated in the body recess 53. Specifically, the conical valve element 56 is biased into seating engagement with the conical recess of body member 52 by spring 60 interposed between the rear face or end of valve element 56 and backplate 46: the conical valve element 56 is connected to the valve stem 61, or equivalent operating member, through a flexible or floating coupling 62 which provides angular correspondence between the positions of the valve stem and the valve element while permitting these members to have relative axial movement and freedom to rotate about independent axes which may not be in perfect alignment due to inevitable slight inaccuracies in machining or assembly. The coupling element 62 is free to move to appreciable extent in the direction of its axis and also in direction normal thereto while maintaining a drive connection between valve stem 61 and valve element 56.

A significant feature of this construction is that the valve element 56 is always free to rotate about an axis defined by the engaged conical surfaces of the valve element 56 and of its seating recess in the valve body without cramping due to any tendency of its operating stem 61 to rotate about a somewhat different axis. The valve body and valve element have no engaging surfaces other than their conical surfaces which alone determine the alignment and axis of rotation of the valve element. Freedom of the valve element to locate and freely turn in its seat continues after long use since, because of the permitted axial movement of the valve element relative to its stem, the spring 60 maintains the conical surfaces in seating engagement as they wear. The torque required to turn the valve element 56 does not increase with increased supply pressure of the controlled fluid. On the contrary, the required torque is decreased with increased supply pressure because the axial component of the force applied to the conical surface of valve element 56 by the controlled fluid tends to unseat the valve rather than jam it into the body recess. The force of spring 60, however, opposes and overcomes such axial component and maintains the valve seated throughout the range of supplied pressures to which the fuel valve is intended to be subjected in the same or different installations. The differential between the spring force and the aforesaid axial component of the supply pressure decreases with increased supply pressure in avoidance of difficulty or impossibility of operating the valve at the higher supply pressures.

The flexible coupling for connecting the valve element 56 to its stem 61 may be of any suitable type: in the particular type shown, one face of the coupling member 62 has a ridge 63 (Fig. 2) received by a groove 63a in the forward face or end of valve element 56 and has a groove 64 in its opposite face to receive the projection 64a of a coupling member attached to or formed at the rear end of the valve stem 61. To the forward end of stem 61, which projects through the boss 65 to valve housing 52, is removably attached a pointer or index 66 (Fig. 1). The "Fuel" scale 68 for index 66 may be attached to or inscribed upon the front wall of valve housing 52. The arm 69 for actuating the valve element 56 is attached, as by a set screw, to the hub of index member 66.

In the mixing valve thus far described, the sleeve 31 may be actuated by arm 38 to effect linear control of the flow of air and arm 69 may be actuated to effect linear control of the flow of fuel. As now briefly described and as more fully described and claimed in copending application Serial No. 269,739, these two arms may be connected by a proportioning linkage which provides for their concurrent actuation with proper proportionality of their individual adjustments as preselected to maintain a fuel-air ratio corresponding with a neutral, a reducing or an oxidizing flame. In the particular proportioning linkage shown in Fig. 1, the arms 38 and 69 are coupled by link 70 which is pivotally connected to arm 38 by a pin 71 which extends through the boss 72 of arm 38. A similar pivot 74 which extends through boss 75 of arm 69 is slidably received by a slot 77 in the opposite end of link 70. The link 70 is also provided with a central slot 78 which receives a fulcrum device 79 adjustable to vary the ratio between concurrent movements of arms 38, 69. In Fig. 1, the upper part of link 70 is broken away to show the slots 77, 78. The fixed bracket member 80 through which the fulcrum device 79 is adjustably secured is attached to the fuel valve body 52 by means not shown and this subassembly is in turn secured to the main housing member 15 of the burner by means not shown.

The gas burner ring 92 attached to tile plate 11 need not be used when the furnace is fired exclusively from the burner 10: if provided for alternative or combined use of gas and liquid fuel, ring 92 serves as the throat of the tile opening when the furnace is oil-fired. Another mixing valve arrangement for oil and/or gas-firing which uses the fuel valve construction herein claimed is shown in the aforesaid application Serial No. 269,739.

In the modified form of fuel valve element shown in Fig. 5, the metering groove 57A is of triangular cross section rather than rectangular as in Figs. 2 to 4. The desired linear relationship between the angular position of valve element 56A with respect to inlet port 54 (Fig. 1) and the flow through the valve may be obtained by properly correlating the face width of the triangular slot (Fig. 6A) to the depth of the slot (Fig. 6B) for each increment of length of the slot. This involves a rather costly and tedious machining operation and in honing of the valve element to final dimensions or in subsequent wear after prolonged use, this essential relationship of width to depth per increment of length may be impaired. However, such valve element 56A may be substituted for the valve element 56 of Figs. 1 and 2 and retains the important feature thereof that it is free to rotate about the independent axis defined by the seating surfaces themselves and is free to move axially under the influence of spring 60, all without restraint by the valve stem 61 or other operating member. The mixing valve of Fig. 1 so modified also has the feature that increasing the supply line pressure cannot jam the valve or make it more difficult to turn.

Like the valve element 56 of Fig. 1, the valve element 56A may have a rear hub 81 to receive the spring 60. Alternatively, either of these valve elements may have the outlet bore enlarged to receive the spring 60: such enlargement 81A of the bore is shown in Fig. 5.

The fuel valves thus far described are particularly suited for low throughputs of fuel oil, for example, of the order of from 5 to 100 gallons per hour; for substantially higher throughputs with the same physical size of the rotatable valve element, for example, of the order of from 100 to 1000 gallons per hour, it is preferable to use the modification shown in Figs. 7 and 8. This modification is also particularly suited for controlling gaseous fuel. In this modification, as in those previously described, the valve element 56B is conical and is biased into seating engagement with the corresponding conical recess in valve body 52B by spring 60. Also as in the preceding modifications, the valve element 56B is connected to its operating member through a flexible coupling so that it is free to rotate about the axis defined by the engaged conical surfaces of the valve element and of the recess.

However in this modification, the metering slot 57B is in direct communication with the outlet bore 59B throughout the length of the slot, so to provide, in cooperation with one or the other end of the elongated inlet port 54B, a flow passage of rectangular cross sectional area varying linearly with the angular position of the valve element. The slot 57B may simply be formed by a milling cutter or saw. Ordinarily the angular length of slot 57B will be somewhat less than 180° and will be substantially equal to the length of the elongated inlet port 54B.

In all modifications disclosed, the assembly comprising the fuel nozzle and the fuel valve is removable as a unit from the mixing valve for replacement or repair without removal of the mixing valve from the furnace.

Features herein disclosed but not claimed are claimed in aforesaid copending applications Serial Nos. 109,983, now Patent No. 2,672,190, and 269,739.

It shall be understood the invention is not limited to the illustrated forms thereof and that changes and modifications may be made within the scope of the appended claims.

What is claimed is:

1. A valve comprising a body member having a conical recess with a port extending outwardly from a side thereof, an operating member supported by said body member for rotation about an axis, biasing spring means, a conical valve member axially biased by said spring means into seating engagement with said recess for rotation about an independent axis continuously determined by the conical seating surfaces and which initially or with wear may be out of alignment with said axis of the operating member, said valve member having an internal flow passage extending to a peripheral metering slot cooperating with said port of the body member, and means coupling said operating member to said conical valve member including a rotatable coupling element having freedom of axial movement for continued maintenance by said spring means of the seating engagement between said conical surfaces despite their wear and having freedom of radial movement for free rotation of said conical valve member about its aforesaid independent axis as at all times determined by the aforesaid engaging conical surfaces.

2. A valve as in claim 1 in which the peripheral slot throughout its length extends directly to said internal passage of the valve element.

3. A valve as in claim 1 in which the peripheral slot is of fixed width and throughout its length extends directly to said internal passage of the valve element.

4. A valve as in claim 1 in which the supply pressure applied to said conical valve member through said port opening tends to unseat said valve without restraint by said operating member or said coupling means in avoidance of increase with increase of supply pressure of the torque required to turn the valve member, and in which the seating force applied solely to said conical valve member by the biasing spring is greater than the axial force component of the supply pressure as applied solely to the conical surface of the valve member.

5. A valve as in claim 4 in which the peripheral metering slot is a groove which progressively increases in cross-sectional area angularly of the valve member and in which the internal flow passage is of greater cross-sectional area for flushing the valve of particles too large to pass through the metering groove.

6. A valve as in claim 5 in which the slot is a rectangular groove and of progressively increasing depth and in which the deep end of the groove terminates in a circular flow passage of uniform diameter greater than the groove width.

7. A valve as in claim 4 including a second body member overlying the larger end of said conical recess and engaging the biasing spring means, a mounting hub extending from the outer face of said second body member, and a flow passage through said hub and second body member.

References Cited in the file of this patent

UNITED STATES PATENTS

| | | |
|---|---|---|
| 762,936 | Paige | June 21, 1904 |
| 946,228 | Kenlon | Jan. 11, 1910 |
| 1,883,727 | Hawley | Oct. 18, 1932 |
| 2,351,372 | Snyder | June 13, 1944 |
| 2,424,328 | Pars | July 22, 1947 |
| 2,449,833 | Barnes | Sept. 21, 1948 |
| 2,494,183 | Lincoln | Jan. 10, 1950 |
| 2,723,102 | Mueller | Nov. 8, 1955 |

FOREIGN PATENTS

| | | |
|---|---|---|
| 737,686 | France | of 1932 |
| 412,499 | Great Britain | June 28, 1934 |
| 458,554 | Great Britain | of 1936 |
| 1,006,998 | France | Apr. 29, 1952 |